N. SIGLIN.
GRINDING MACHINE FOR BAND CUTTER KNIVES.
APPLICATION FILED OCT. 29, 1908.
916,044.
Patented Mar. 23, 1909.
2 SHEETS—SHEET 2.
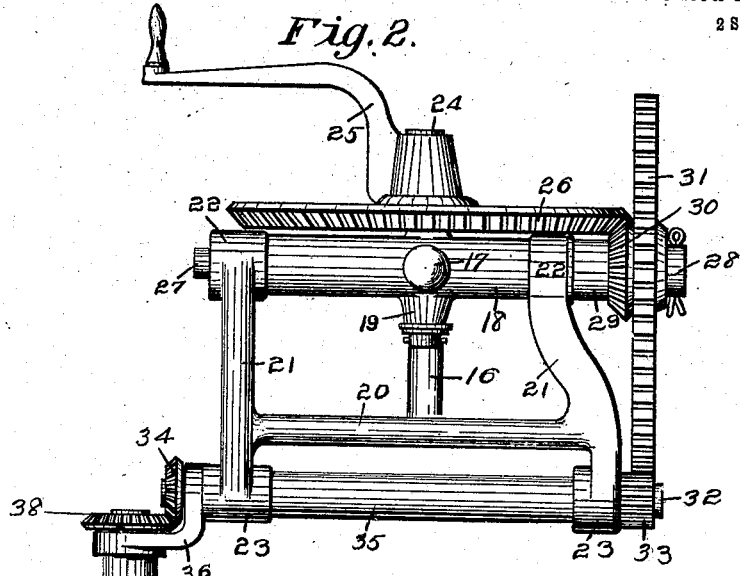
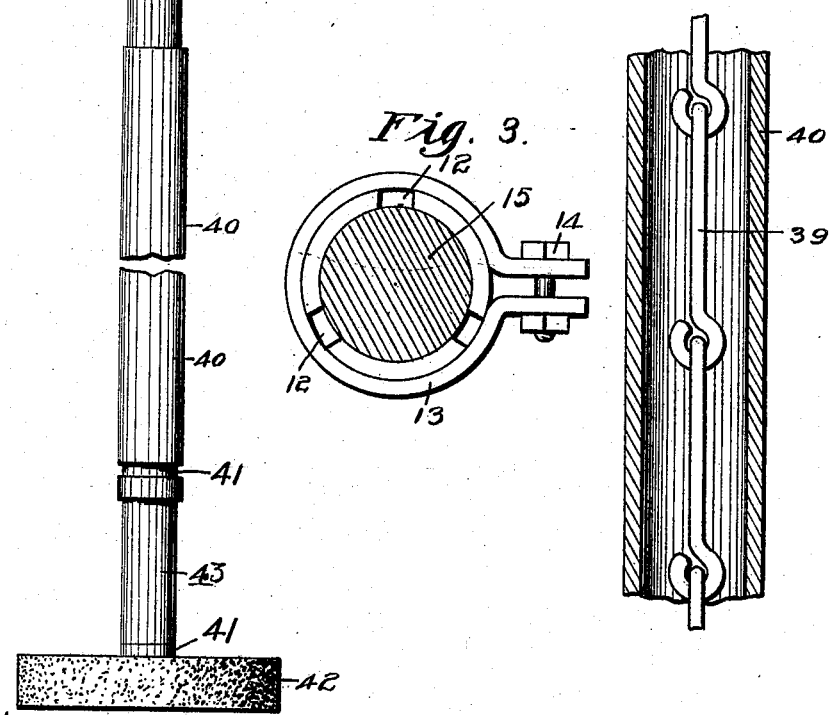
Witnesses.
F. C. Dahlberg.
A. G. Hague.
Inventor.
Nelson Siglin.
by Orwig & Lane, atty's

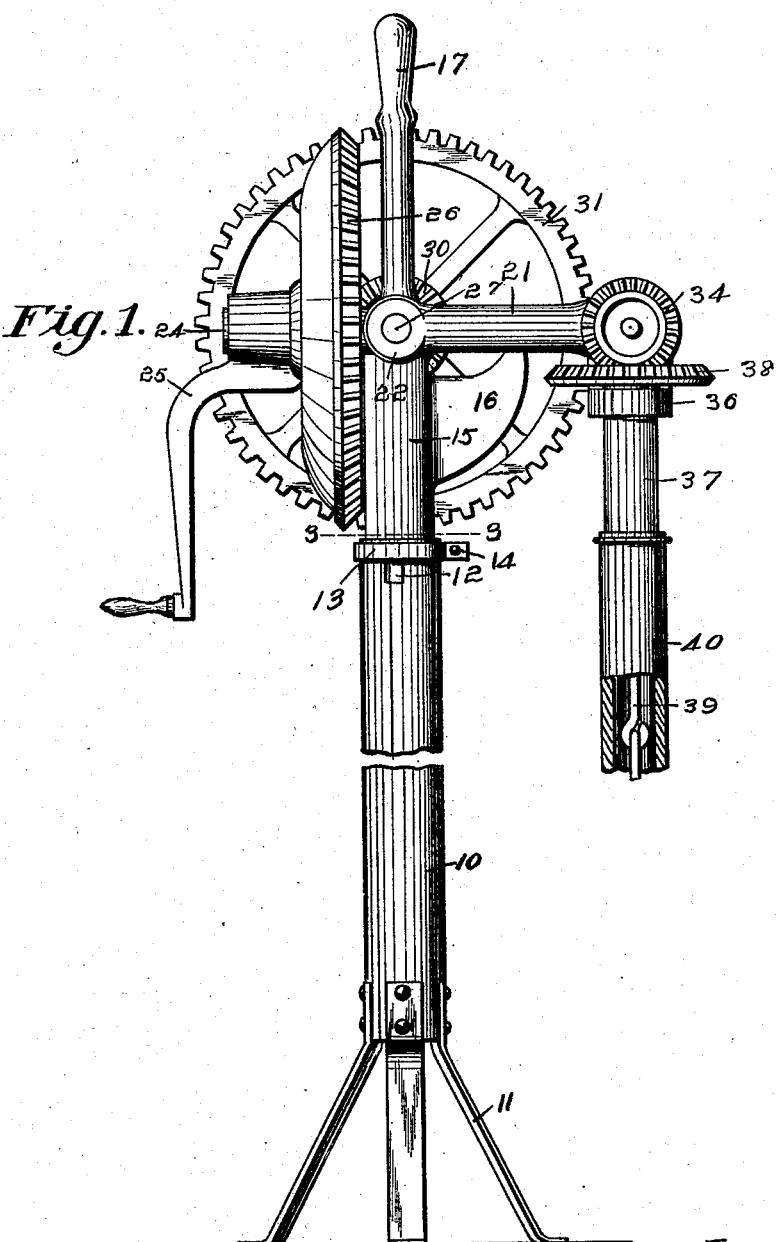

UNITED STATES PATENT OFFICE.

NELSON SIGLIN, OF AURELIA, IOWA.

GRINDING-MACHINE FOR BAND-CUTTER KNIVES.

No. 916,044.

Specification of Letters Patent.

Patented March 23, 1909.

Application filed October 29, 1908. Serial No. 460,150.

*To all whom it may concern:*

Be it known that I, NELSON SIGLIN, a citizen of the United States, residing at Aurelia, in the county of Cherokee and State of Iowa, have invented a certain new and useful Grinding-Machine for Band-Cutter Knives, of which the following is a specification.

The object of my invention is to provide a grinding machine of simple, durable and inexpensive construction, and of few parts, especially designed for use in grinding the knives of a band cutter and self-feeding device for threshing machines. It is to be understood that knives of this kind cannot quickly and easily be detached from the rest of the machinery, and hence it is desirable that the means for sharpening them be so arranged that the grinding machine may be conveniently and easily operated by hand, and the grinder applied to the band cutter knives while they are still in position in a machine of the class set forth.

My object therefore is to provide a machine of this class of compact structure, capable of being placed in various positions, and being readily and easily carried and contained in a small space.

My invention consists in the construction, arrangement and combination of the various parts of the device, whereby the objects contemplated are attained, as hereinafter more fully set forth, pointed out in my claim and illustrated in the accompanying drawings, in which—

Figure 1 is a side elevation of the standard and gearing with a small portion of the flexible shaft attached to the frame. Fig. 2 shows a top or plan view of same. Fig. 3 shows an enlarged sectional view on the line 3—3 of Fig. 1, and Fig. 4 shows a detail sectional view of the flexible shaft.

Referring to the accompanying drawings, I have used the reference numeral 10 to indicate the standard of the device, which standard is preferably made of a single piece of tubing or pipe, and is provided with legs 11 at its lower end. Its upper end is slotted at 12, as shown in Fig. 3, and a clip 13 is extended around it and provided with an adjusting bolt 14 in its end, by which the parts of the standard between the slots 12 may be pressed inwardly.

The supports for the gearing devices are preferably made of two castings, the first one comprising an upright member 15 fitted into the upper end of the tubular standard 10, and having an arm 16 extended upwardly and outwardly from it, and also having an integral handle 17 at its top extended upwardly, and a transverse bearing 18, and another transverse bearing 19 at right angles to the bearing 18. All of the parts 15, 16, 17, 18, and 19 are cast complete in one piece. The other part of the gearing supporting frame comprises a central cross piece 20, two arms 21 having bearings 22 at their ends, and bearings 23 at their other ends. The cross piece 20 is designed to rest on and be supported by the arm 16.

Mounted within the bearing 19 is a shaft 24 having a handle 25 thereon, and a large beveled pinion 26. In one end of the bearing 18 is a pin 27 having the bearing 22 mounted thereon, and on the other end of the bearing 18 is a shaft 28 extended through the bearing 22, and fixed in position in the bearing 18.

Rotatably mounted upon the shaft 28 is a sleeve 29 having a small beveled pinion 30 thereon to mesh with the pinion 26, and a cog wheel 31. Rotatably mounted in the bearings 23 is a shaft 32 having on one end a pinion 33 in mesh with the pinion 31, and on its other end, a small beveled pinion 34. A sleeve 35 surrounds the shaft 32 and is extended through the bearings 33 and on the end of said sleeve 35 adjacent to the pinion 34 is a hanger 36 fixed to the sleeve 35. This hanger supports a short rotatable shaft 37 provided with a beveled pinion 38 in mesh with the pinion 34. Connected with the shaft 37 is a flexible shaft 39 covered by a flexible hose 40. The other end of the flexible shaft 39 is attached to a short shaft 41 and connected with the short shaft 41 is a grinding wheel 42. A sleeve 43 is rotatably mounted upon the short shaft 41, to thereby provide a convenient handle.

In practical use, the operator grasps the handle 17 and moves the grinding machine to the desired position adjacent to the band cutter knives. The frame may be conveniently and easily held either in an upright position, or at any angle by means of said handle. Then the operator turns the crank 25, which results in imparting a rotary motion at a greatly increased speed, to the grinding wheel.

The part 15 may be rotated upon the standard, and the bracket 36 may be rotated upon the sleeve 35 in a plane opposite from that in which the part 15 may be rotated, so that a universal movement of the short shaft 37 is thereby permitted.

By arranging the parts as shown, it is obvious that the machinery is very compact, and occupies a small space, and yet the speed of rotation is greatly increased from the crank 25 to the grinding wheel.

All of the parts are readily detachable and replaceable, and the entire device may be quickly and easily assembled so that it is inexpensive in construction, and it is also strong and durable in operation.

I claim as my invention:

In a grinding machine of the class described, the combination of a tubular upright, slotted at its upper end, an adjustable clamp mounted on the slotted end, legs fixed to the other end of the upright, a frame member comprising an upright portion inserted in the slotted upper end of the tubular upright, a handle at the upper end of said frame member, a bearing formed in said frame member, a crank and a beveled pinion fixed to said shaft, a second bearing formed on said frame member at right angles to the first, a stationary shaft mounted therein, a beveled pinion and a cog wheel united with each other and rotatably mounted on the stationary shaft, and an arm formed integral with the frame member and extended upwardly, a second frame member comprising a cross piece and two side members, the latter having bearings at one end to receive said stationary shaft and also having bearings at their ends, a rotatable sleeve mounted in said latter bearings, said cross piece being designed to rest on said arm on the first mentioned frame member, a rotatable shaft within said sleeve, a pinion on one end in mesh with said cog wheel, a small beveled pinion on the other end, a bracket fixed to said sleeve, a short shaft mounted in said bracket, a beveled pinion thereon in mesh with the last mentioned beveled pinion, a flexible shaft connected with said short shaft, and a grinding wheel connected with the other end of the flexible shaft, arranged and combined substantially in the manner set forth, and for the purposes stated.

Des Moines, Ia., Oct. 12, 1908.

NELSON SIGLIN.

Witnesses:
CHAS. GRIGSBY,
T. B. PARKER, Jr.